Nov. 7, 1939.   G. J. CAMPBELL, JR   2,178,952
CHAIN LINK
Filed Aug. 11, 1938

INVENTOR
George J. Campbell, Jr.
BY
Gifford, Scull & Burgess
ATTORNEYS.

Patented Nov. 7, 1939

2,178,952

UNITED STATES PATENT OFFICE 2,178,952

CHAIN LINK

George J. Campbell, Jr., York, Pa., assignor to International Chain & Manufacturing Company, York, Pa., a corporation of Pennsylvania Application August 11, 1938, Serial No. 224,232

3 Claims. (Cl. 152—243)

This invention relates to a novel and improved form of chain link, the novel features of which will be best understood from the following description and the annexed drawing, in which I have shown a selected embodiment of the invention and in which.

A link constructed according to my invention is of a form which obviates the necessity of welding and yet forms a link of the desired strength, at the same time, if desired, providing means for preventing skidding when the link is used on a tire chain.

Figure 3:
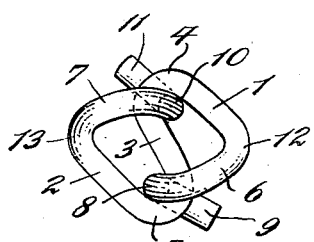
Fig. 3 is a view of one of the links separated from the chain.
Figure 4:
Fig. 4 is a view of the link shown in Fig. 3 as viewed from either the right or the left of Fig. 3.

Referring first to Figs. 3 and 4 it will be seen that the link is formed of a single piece of chain stock, which may be a wire or bar and which is continuous, although not endless. The piece of stock is formed into the general form of a Z, with two legs 1 and 2 connected by a diagonal 3. The diagonal is joined to the legs 1 and 2 by loops 4 and 5, respectively. Each leg is provided with an extension 6 or 7, the extension 6 being formed into a hook 8 which extends through the loop 5. The end 9 of the extension or, in other words, the end of the hook, may conveniently extend outwardly from the link, as indicated in Fig. 3, so as to form a projection with a sharp edge adapted to engage the surface of the ground in case the chain is used for anti-skid purposes. Similarly, the extension 7 has a hook 10 engaging the loop 4 and having an end 11 which is shown as arranged generally parallel to the end 9 and for the same purpose.

The resulting link has the two end loops 12 and 13 which may receive corresponding loops of other links to form a chain, and the loops 4 and 5 may be for convenience referred to as side loops of the link.

For convenience, it will be assumed that Fig. 4 shows the link as it appears when viewed from the left of Fig. 3, although the appearance will be the same as viewed from the right of Fig. 3.

Figure 1:
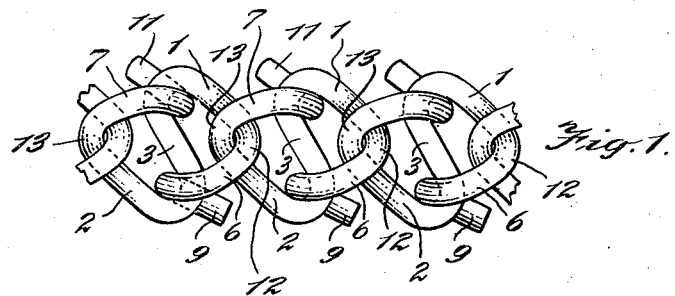
Fig. 1 is a plan view of a portion of a chain having links constructed according to my invention.
Figure 2:
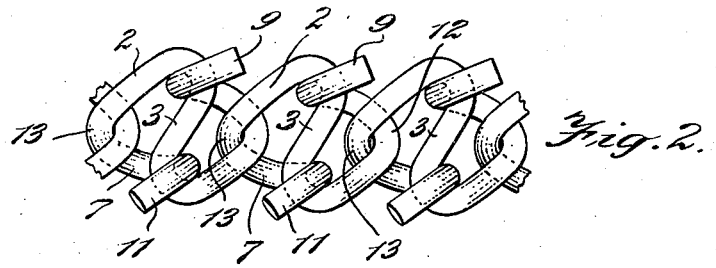
Fig. 2 is a view of the same structure as shown in Fig. 1, as seen from the opposite side of the chain.

When the links thus made are assembled in a chain, they will appear somewhat as shown in Figs. 1 and 2, Fig. 1 showing the links as viewed from the top, the same as in Fig. 3, whereas Fig. 2 shows the links as viewed from the bottom thereof. It will be seen that each link will be held in the chain by engagement of the hooks engaging the side loops of the link and this hooked engagement is sufficient to prevent opening of the link under all usual conditions to which a chain is subjected. Therefore no welding is necessary.

Figure 6:
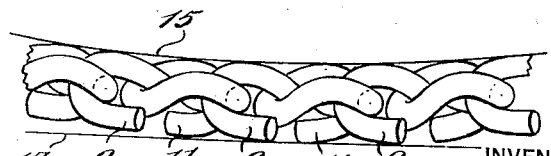
Fig. 6 is a fragmentary view of a chain formed of my improved links as used on a tire chain.

At the same time the projecting ends 9 and 11 form lugs or anti-skid projections, as indicated diagrammatically in Fig. 6, wherein the numeral 14 is used to designate the surface of the ground or pavement, and the numeral 15 is used to designate the surface of a tire on an automobile to which the chain may be applied. It will be seen that the ends 9 and 11 project in generally opposite directions lengthwise of the chain and both present sharp edges to prevent skidding.

Figure 5:
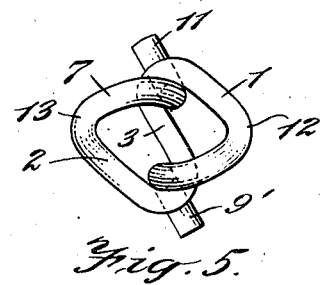
Fig. 5 is a view similar to Fig. 3 but showing a slightly different embodiment of the invention.

In Fig. 5 I have shown a link of the same general form as in the other figures, but here the two ends 9' and 11' are bent at a different angle with respect to the length of the link or length of the chain. It will be seen that this angle may be varied between substantial limits without weakening the chain, thus permitting the sharp edges of the ends of the piece of stock to be placed at any desired angle which may be thought desirable for preventing skidding.

While I have shown a certain form of link, it will be understood that various changes in details may be made therein without departing from the scope of the invention as defined in the appended claims.

I claim:

1. A chain link comprising a continuous piece of stock bent into the general form of a Z, with two legs connected to a diagonal portion by loops, each leg having an extension hooked through the loop between the diagonal and the other leg.

2. A chain link comprising a continuous piece of stock bent into the general form of a Z, with two legs connected to a diagonal portion by loops, each leg having an extension hooked through the loop between the diagonal and the other leg and the two ends themselves extending outwardly from the link to form anti-skid projections.

3. A chain link comprising a piece of stock bent to form two legs connected to a diagonal by loops, each of said legs having an extension bent into a hook which passes through one of said loops, the ends of said hooks forming ground-engaging lugs.

GEORGE J. CAMPBELL, JR.